United States Patent [19]

Eisold

[11] Patent Number: 4,737,061

[45] Date of Patent: Apr. 12, 1988

[54] MOBILE BUCKET CONVEYOR FOR BULK MATERIALS

[75] Inventor: Horst Eisold, Ingbert, Fed. Rep. of Germany

[73] Assignee: PBB Weserhütte AG, Cologne, Fed. Rep. of Germany

[21] Appl. No.: 857,755

[22] PCT Filed: Jul. 18, 1985

[86] PCT No.: PCT/EP85/00356

§ 371 Date: Apr. 16, 1986

§ 102(e) Date: Apr. 16, 1986

[87] PCT Pub. No.: WO86/00873

PCT Pub. Date: Feb. 13, 1986

[30] Foreign Application Priority Data

Jul. 24, 1984 [DE] Fed. Rep. of Germany ....... 3427170

[51] Int. Cl.⁴ .................... B65G 65/28; B65G 67/60
[52] U.S. Cl. ..................................... 414/139; 37/190; 198/509; 198/518; 414/143
[58] Field of Search .................. 414/139, 143, 145; 198/509, 518; 37/190

[56] References Cited

U.S. PATENT DOCUMENTS 3,616,890 11/1971 Pradon ............................ 414/139 X
4,261,678 4/1981 Krüger ............................ 414/139 X

FOREIGN PATENT DOCUMENTS 2100956 7/1972 Fed. Rep. of Germany ...... 414/139
2123249 11/1972 Fed. Rep. of Germany .
2210311 9/1973 Fed. Rep. of Germany .
3043448 6/1982 Fed. Rep. of Germany ...... 414/139
560751 4/1944 United Kingdom .

Primary Examiner—Leslie J. Paperner
Attorney, Agent, or Firm—Spencer & Frank

[57] ABSTRACT

A mobile bucket mechanism for collection and conveyance of a bulk material which includes buckets carried by chains over generally vertically arranged sheaves, a support structure for the sheaves which drives the chains to move the buckets in a path to collect bulk material located at a lower end of the path. A feeding device is driven by the support structure to cut into the bulk material and feed the bulk material to the buckets. The feeding device includes a stationary, jacket-like cylindrical body surrounding the path of the buckets and the lower portion of the supporting structure. The cylindrical body has an opening adjacent a portion of the path along which the buckets are carried upward by the chains. A cutting head surrounds the cylindrical body and has essentially radially oriented blades rotatable with respect to the cylindrical body so as to supply the bulk material to the opening. In the preferred embodiment, a ball bearing equipped rotary connection to the supporting structure has an upper ring connected with the supporting structure and a lower ring supporting the cutting head. The supporting structure has a supporting ring which is fastened to the cylindrical body. Since all cuts provided by the mechanism are generated by the rotating cutting head and are transmitted directly into the supporting structure by way of the ball bearing equipped rotary connection, the forces on the buckets and their guides are relieved. The buckets then perform only a scooping and not a cutting movement.

14 Claims, 4 Drawing Sheets 4,737,061

MOBILE BUCKET CONVEYOR FOR BULK MATERIALS

BACKGROUND OF THE INVENTION

The invention relates to a mobile bucket mechanism for the vertical or inclined collection and conveyance of bulk materials from ships or storage sites, the mechanism including a supporting structure for the return sheaves of the chains carrying the circulating buckets, with the buckets receiving the bulk material during a forward movement of the supporting structure.

To collect the bulk material, the known mobile bucket mechanisms are dipped into the bulk material and are then moved into the advancing direction transversely to the direction of movement of the buckets. In this case, the buckets perform a strong cutting function. Since the cutting and advancing forces are fully transferred from the buckets and the chain sheaves to the supporting structure of the bucket mechanism and the return sheaves for the chains, wear of buckets, chains, guides and return sheaves is unavoidable. For that reason such bucket mechanisms are of robust design which, however, results in a great amount of dead weight which is a drawback, particularly if the bucket mechanism is suspended from the tip of the cantilever arm of a ship's unloading apparatus. Moreover, such wear results in work interruption and the need for replacement parts, thus increasing operating and maintenance costs, reducing service life and correspondingly increasing layover costs for ships.

SUMMARY OF THE INVENTION

It is the object of the invention to substantially free the buckets and chain guides of a mobile bucket mechanism including a supporting structure for return sheaves for the chains carrying the circulating buckets, with the buckets collecting bulk material during advancing movement of the supporting structure, and a feeding device rotatably displaced and driven by the supporting structure for cutting into the bulk material and feeding it to the buckets, from the stresses of the advancing movement.

This is accomplished by providing that the feeding device is composed of a stationary, cylindrical body which surrounds the lower receiving end of the supporting structure in the manner of a jacket as well as the paths of the buckets while leaving free their lower point of reversal and which is provided with an opening in the region of the upwardly moving buckets, and the cylindrical body is surrounded by a cutting head which is equipped with essentially radially oriented blades that are rotatable with respect to the cylindrical body with cutting head supplying the bulk material to the opening.

In this way, it is accomplished that the buckets of the bucket mechanism perform only a scooping function while the cutting forces are absorbed by an independent element which simultaneously supplies the bulk material to the bucket mechanism and which is arranged in such a manner that the cutting forces for loosening the bulk material and the forces resulting from the advancing movement are dissipated directly into the supporting structure of the bucket mechanism. This element is the driven cutting head whose blades cut the bulk material independently of the advancing direction of the supporting structure and convey it to the opening of the stationary cylindrical jacket which is surrounded by the rotating cutting head.

In accordance with further features of the invention with respect to the configuration of the blades of the cutting head, the blades of the cutting head extend to below the stationary jacket, the blades are provided with inwardly oriented extensions, and the blades are provided with divergingly oriented cutting edges and the cutting head is reversibly driven. Recommended structural features of the cutting head and its connection to the supporting structure of the bucket mechanism include:

a. the supporting structure is provided with a supporting ring at which is fastened the stationary jacket, and an upper ring of a ball bearing equipped rotary connection is connected with the supporting structure, a lower ring of the ball bearing equipped rotary connection supporting the cutting head.

b. the lower ring of the ball bearing equipped rotary connection is provided with teeth into which engages the drive pinion of a drive motor.

c. the cutting head is designed as a basket which is resistant to bending and twisting and is composed of an intermediate ring connected with the lower ring, radial bars connected with the intermediate ring and distributed over the circumference as supports for the blades and a lower stabilizing ring which penetrates the radial bars as well as the blades and is welded to the radial bars to which the blades are releasably fastened.

BRIEF DESCRIPTION OF THE DRAWINGS

One embodiment of the invention is illustrated in the drawings in which.

DESCRIPTION OF THE PREFERRED EMBODIMENT

Figure 1:
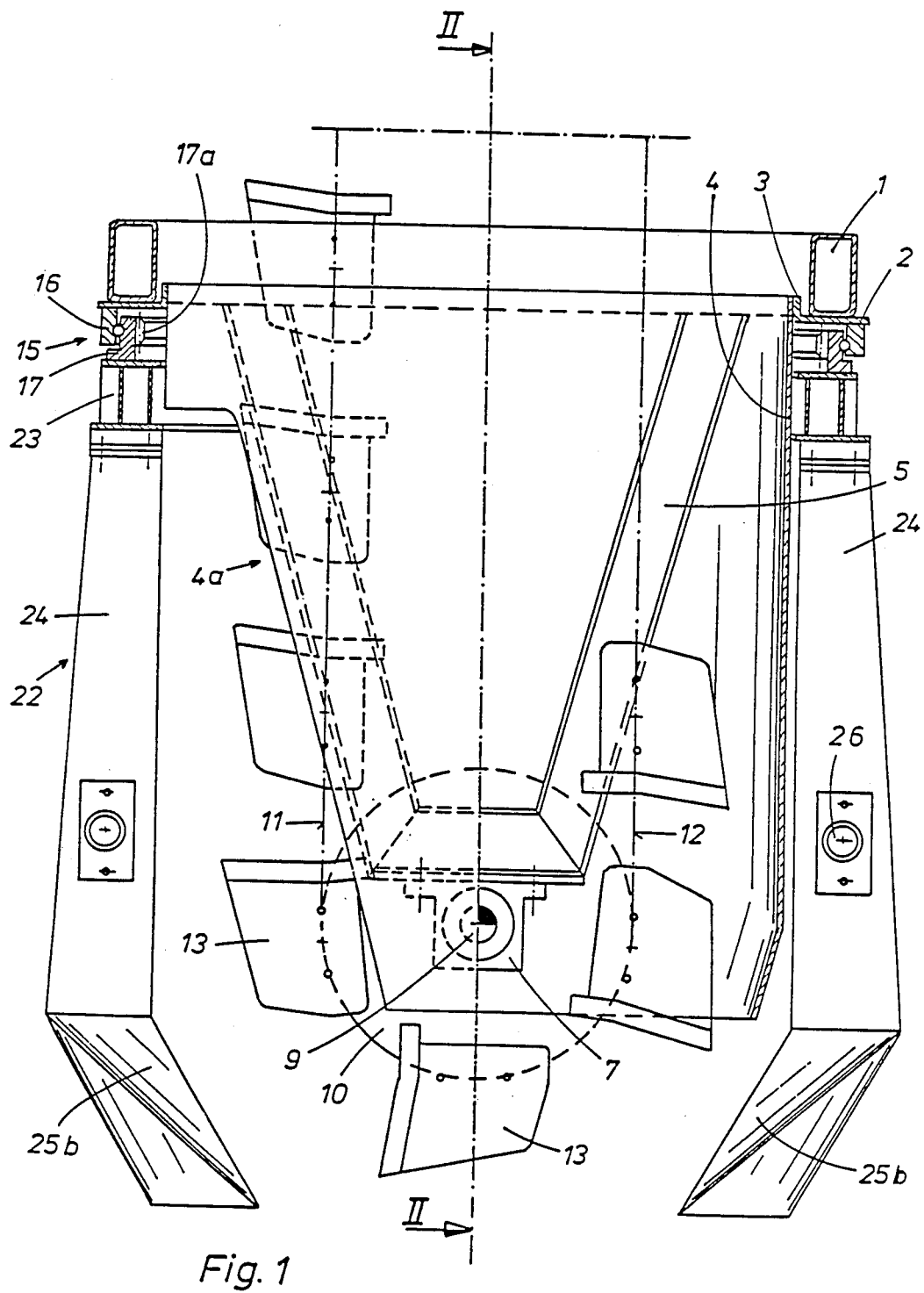
FIG. 1 is a vertical sectional view of the lower end of the bucket mechanism transversely to the axes of the return sheaves.
Figure 2:
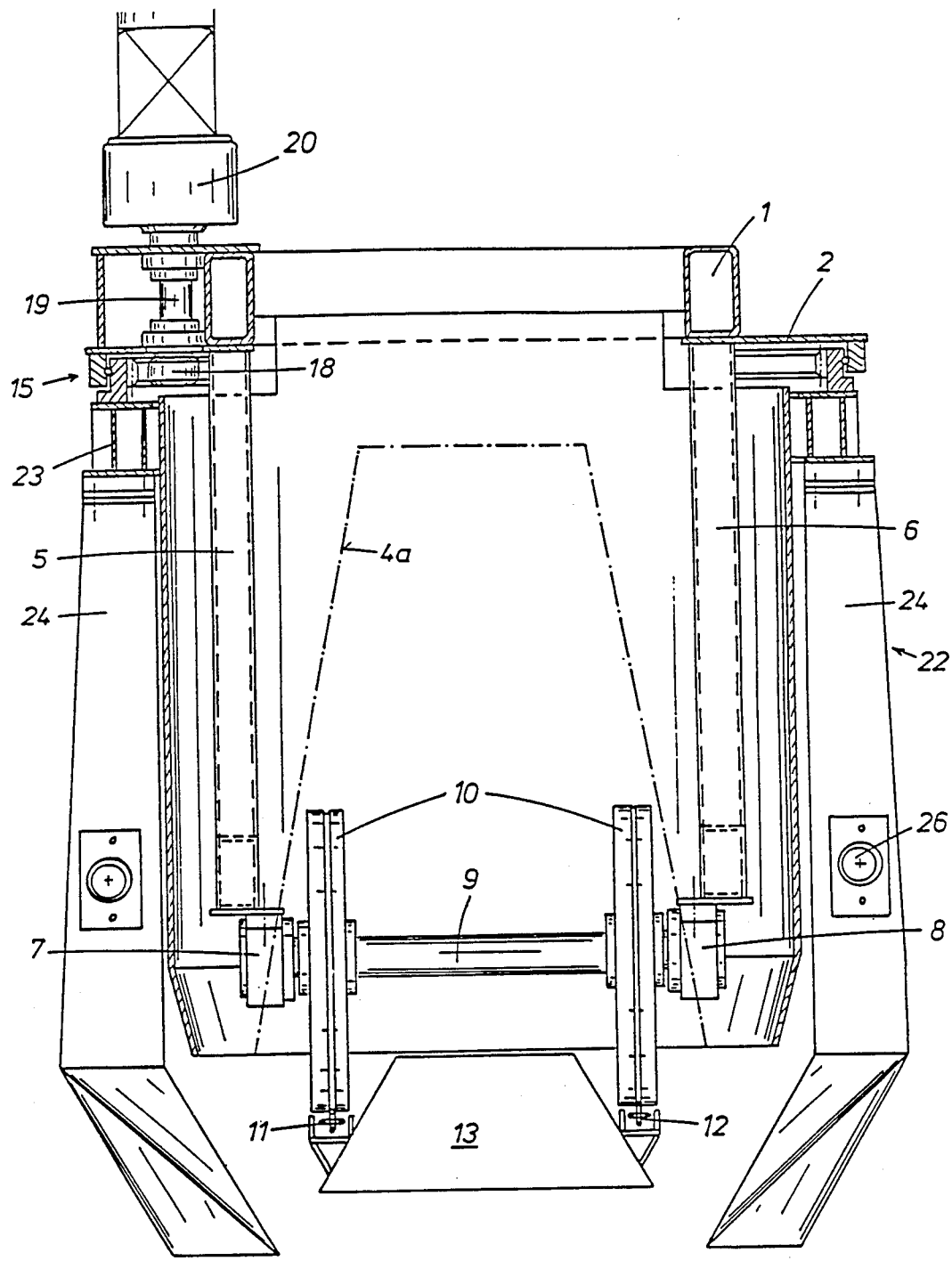
FIG. 2 is a vertical sectional view along line II—II of FIG. 1.
Figure 3:
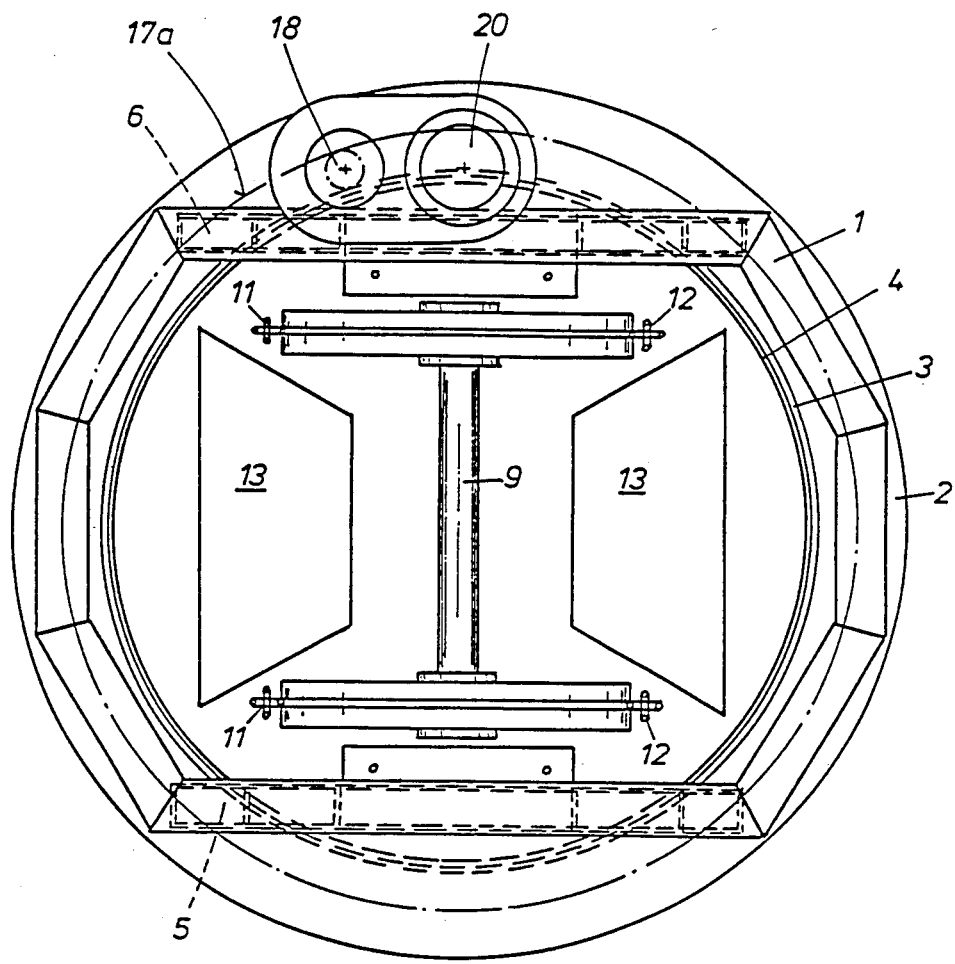
FIG. 3 is a top view of FIG. 2, rotated about 90°.

The upper connecting frame 1 shown in FIGS. 1, 2 and 3 is part of the non-illustrated upper portion of the supporting structure of the bucket mechanism and supports all parts of the structure according to the invention including the lower return pulleys (sheaves) 10 for chains 11, 12 carrying buckets 13.

Below connecting frame 1, there is disposed an annular disc 2 having a supporting ring 3 at its circular inner edge. The upper edge of a stationary cylindrical jacket 4 is fastened to supporting ring 3 and surrounds the paths of the buckets while leaving free the lower return sheaves, as shown in FIG. 1. In the region of the upwardly moving bucket 13, jacket 4 is cut open so that an opening 4a is produced whose outline is shown in dashed lines in FIG. 2 since opening 4a lies in front of the plane of the drawing. Within jacket 4, the downwardly moving buckets 13 are thus covered with respect to the bulk material, while the upwardly moving buckets are able to receive the bulk material in the region of opening 4a.

Supporting bars 5, 6 extend from supporting ring 2 into the interior of jacket 4 so as to support bearing blocks 7, 8 for the lower shaft 9 of a pair of return sheaves 10 which guide chains 11, 12. The upper return of the chains is disposed in the non-illustrated upper portion of the supporting structure for the bucket mechanism.

A ball bearing equipped rotary connection marked generally with 15 is fastened to the outer edge of supporting ring 3 and supports the rotatable cutting head 22. The ball bearing equipped rotary connection 15 includes a stationary upper ring 16 and a rotatable lower ring 17 which are coupled with one another by means of a ring of balls so as to be axially undisplaceable.

Figure 4:
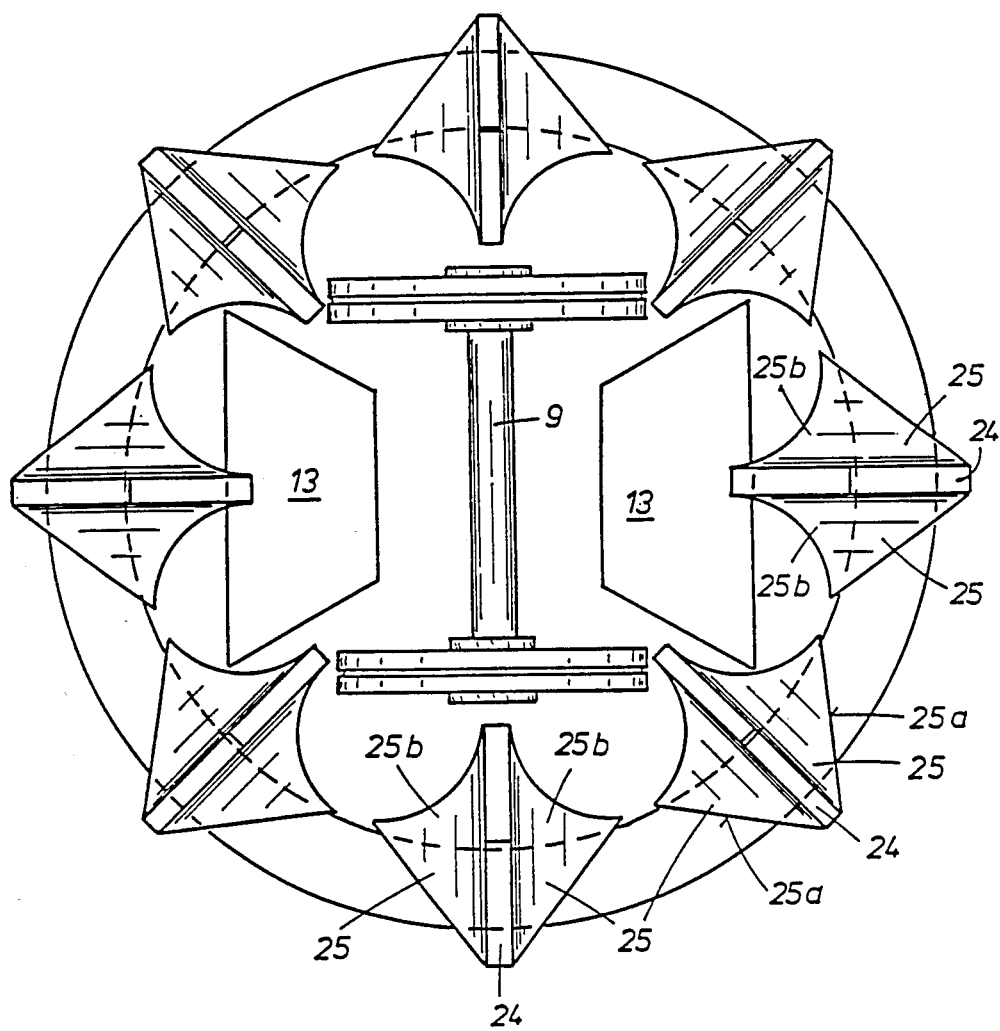
FIG. 4 is a bottom view of FIG. 1.

The lower ring 17 is provided with internal teeth 17a which are in engagement with a drive pinion 18 (FIG. 2). Drive pinion 18 is driven via a drive shaft 19 by a drive motor 20 which, in the illustrated embodiment, is reversible, as will be explained below. The rotating cutting head 22 is connected, through the intermediary of a ring 23, with the rotatable lower ring 17 of the ball bearing equipped rotary connection 15. Radial webs 24 (FIGS. 1 and 4) are distributed over the circumference and extend downwardly from intermediate ring 23. They are each equipped with blades 25 which are curved on both sides and involute so that diverging cutting edges 25a result. For that reason, cutting head 22 of this embodiment is driven to be reversible so as to be able to cut bulk material in each direction of rotation and transport it to the opening 4a of stationary jacket 4.

As shown in FIGS. 1 and 2, blades 25 are provided with inwardly oriented extensions 25b which extend to below the lower edge of cylindrical jacket 4, i.e. to below the bucket 13 which is in the lowest position.

All radial webs 24 and blades 25 are penetrated by a stabilization ring 26 which is connected with the radial bars by means of welding. In this way, cutting head 22 is designed as a basket which is resistant to bending and twisting and is able to absorb the cutting and transporting forces without being deformed. Blades 25 are releasably connected with the radial bars since they are expediently exchanged in adaptation to the respective bulk material.

If the lower cutting head end of the bucket mechanism according to the invention shown in the drawing is dipped into the bulk material, cutting edges 25a of blades 25 cut into the bulk material and transport it to opening 4a of jacket 4 where it is scooped up by the ascending buckets 13. This mode of operation is independent of any advancing movement of the bucket mechanism.

Thus, it is no longer necessary to rotate the entire bucket mechanism about 180° at the conclusion of one lateral advance so as to empty, for example, a cargo hatch which is to be cleaned out in a zigzag advancing movement. The bucket mechanism according to the invention is also able to empty a silo without significant lateral advancing movement, i.e. advancing essentially only vertically since the bulk material surrounding cutting head 22, if it is flowable bulk material, is always brought to opening 4a of jacket 4.

Since all cutting forces are generated by the rotating cutting head and are transmitted directly into the supporting structure of the bucket mechanism by way of the ball bearing equipped rotary connection 15, buckets 13 and their guides (members 7-12) are relieved. Buckets 13 then perform only a scooping and no longer a cutting movement.

What is claimed is:

1. A mobile bucket mechanism for vertical or inclined collection and conveyance of bulk material from ships or storage sites, said mechanism comprising:
    at least one bucket, each bucket having an open top, said top being defined by a circumferential edge for receiving bulk material thereacross for collection in said each bucket;
    means for carrying said at least one bucket upwardly and downwardly in a closed path having a lower end;
    return pulleys adjacent said lower end of said closed path, said carrying means being trained over said pulleys;
    a support structure supporting said pulleys and driving said carrying means to move said at least one bucket in said path so as to collect bulk material located at said lower end;
    means, including a feeding device driven by said support structure, for cutting into the bulk material and feeding the bulk material to said at least one bucket, said feeding device including a stationary, jacket-like cylindrical body surrounding such path and a lower portion of said support structure which supports said pulleys, said feeding device terminating above said lower end so that said at least one bucket is carried by said carrying means below said cylindrical body, said cylindrical body having an opening adjacent a portion of said path along which said at least one bucket is carried upwardly by said carrying means;
    a cutting head surrounding said cylindrical body and having essentially radially oriented blades having diverging cutting edges extending below the lowest point of said circumferential edge of each bucket as it is carried by said carrying means along said path, said cutting head being rotatable about said cylindrical body so as to supply the bulk material to said opening thereby to expose the supplied bulk material to said at least one bucket for collection thereby;
    said support structure comprising means for reversibly driving said cutting head; and
    a ball bearing equipped rotary connection connected with said supporting structure, said connection having an upper ring connected with said supporting structure and a lower ring supporting said cutting head, said supporting structure having a supporting ring, said cylindrical body being fastened to said supporting ring.

2. A mechanism as in claim 1, wherein said means for carrying are chains, said pulleys are sheaves and said at least one bucket comprises a plurality of buckets.

3. A mechanism as in claim 1, further comprising a drive motor having a drive pinion, said lower ring has teeth being engagable with said drive pinion.

4. A mechanism as in claim 1, wherein said cutting head is basket shaped so as to be resistant to bending and twisting, said cutting head including an intermediate ring connected with said lower ring, radial bars connected with said intermediate ring and distributed over the circumference of said intermediate ring so as to support said blades, and a lower stabilizing ring which penetrates said radial bars and said blades and is welded to said radial bars, said blades being releasably fastened to said radial bars.

5. A mobile bucket mechanism for vertical or inclined collection and conveyance of bulk material from ships or storage sites, said mechanism comprising:
    at least one bucket;

means for carrying said at least one bucket upwardly and downwardly in a closed path having a lower end;

return pulleys adjacent said lower end of said closed path, said carrying means being trained over said pulleys;

a support structure supporting said pulleys and driving said carrying means to move said at least one bucket in said path so as to collect bulk material located at said lower end;

means, including a feeding device driven by said support structure, for cutting into the bulk material and feeding the bulk material to said at least one bucket, said feeding device including a stationary, jacket-like cylindrical body surrounding said path and a lower portion of said support structure which supports said pulleys, while leaving free the lowest point of movement of said at least one bucket, said cylindrical body having an opening adjacent a portion of said path along which said at least one bucket is carried upwardly by said carrying means;

a cutting head surrounding said cylindrical body and having essentially radially oriented blades rotatable with respect to said cylindrical body so as to supply the bulk material to said opening; and a ball bearing equipped rotary connection connected with said supporting structure, said connection having an upper ring connected with said supporting structure and a lower ring supporting said cutting head, said supporting structure having a supporting ring, said cylindrical body being fastened to said supporting ring.

6. A mechanism as in claim 5, wherein said means for carrying are chains, said pulleys are sheaves and said at least one bucket comprises a plurality of buckets.

7. A mechanism as in claim 5, wherein said lower ring has teeth engagable with a drive pinion of a driving motor.

8. A mechanism as in claim 5, further comprising a drive motor having a drive pinion, said lower ring having teeth engagable with said drive pinion.

9. A mechanism as in claim 5, wherein said cutting head is basket shaped so as to be resistant to bending and twisting, said cutting head including an intermediate ring connected with said lower ring, radial bars connected with said intermediate ring and distributed over the circumference of said intermediate ring so as to support said blades, and a lower stabilizing ring which penetrates said radial bars and said blades and is welded to said radial bars, said blades being releasably fastened to said radial bars.

10. A mechanism as in claim 5, wherein said blades have inwardly oriented extensions.

11. A mechanism as in claim 10, wherein said blades have diverging cutting edges, said support structure comprising means for reversibly driving said cutting head.

12. A mechanism as in claim 11, further comprising a ball bearing equipped rotary connection connected with said supporting structure, said connection having an upper ring connected with said supporting structure and a lower ring supporting said cutting head, said supporting structure having a supporting ring, said cylindrical body being fastened to said supporting ring.

13. A mechanism as in claim 12, further comprising a drive motor having a drive pinion, said lower ring having teeth engagable with said drive pinion.

14. A mechanism as in claim 12, wherein said cutting head is basket shaped so as to be resistant to bending and twisting, said cutting head including an intermediate ring connected with said lower ring, radial bars connected with said intermediate ring and distributed over the circumference of said intermediate ring so as to support said blades, and a lower stabilizing ring which penetrates said radial bars and said blades and is welded to said radial bars, said blades being releasably fastened to said radial bars.

* * * * *